Figure 2:
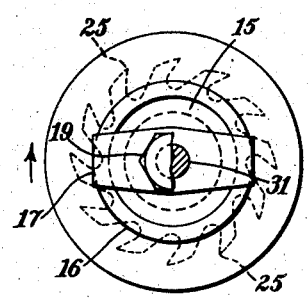

April 13, 1948.　　　　E. J. RAY　　　　2,439,486

ROTARY CUTTER HEAD

Filed July 27, 1946

Inventor
Eugene J. Ray
By his Attorney

Patented Apr. 13, 1948

2,439,486

UNITED STATES PATENT OFFICE 2,439,486

ROTARY CUTTERHEAD

Eugene J. Ray, Beverly, Mass., assignor to United Shoe Machinery Corporation, Flemington, N. J., a corporation of New Jersey Application July 27, 1946, Serial No. 686,761

2 Claims. (Cl. 12—17)

The purpose of this invention is to provide an improved rotary cutter-head assemblage in which a single screw will suffice to maintain all the elements in assembled relation with all but one of them clamped positively thereby, and that one held with yielding force which enables it to take different positions in response to demands of the work.

The invention is not necessarily limited to any one type of work, nor to any specific cutting operation, but for purposes of illustration it is herein represented as embodied in a cutter-head intended to cut a groove in the perimeter of an unattached sole for a certain type of shoe. The illustrated sole and the type of shoe to which it is related involve the problem of maintaining a constant distance between one face of the sole or successive soles and the groove-cutter, despite differences in the thickness of the margin or margins to be provided with grooves.

The elements required in a cutter-head assemblage organized to operate as stated above prevent sharpening the cutting edges of the groove-cutter. Consequently, it is necessary to disassemble the cutter-head whenever the cutter is to be sharpened, and it may be necessary to do so three or four times every working hour. Although one of the work-engaging members of the rotary assemblage must be capable of yielding while all the others are rigidly related to the shaft by which they are carried, the invention provides a construction that enables a single clamping screw to set up all the required relations and maintain the assemblage intact.

Figure 1:
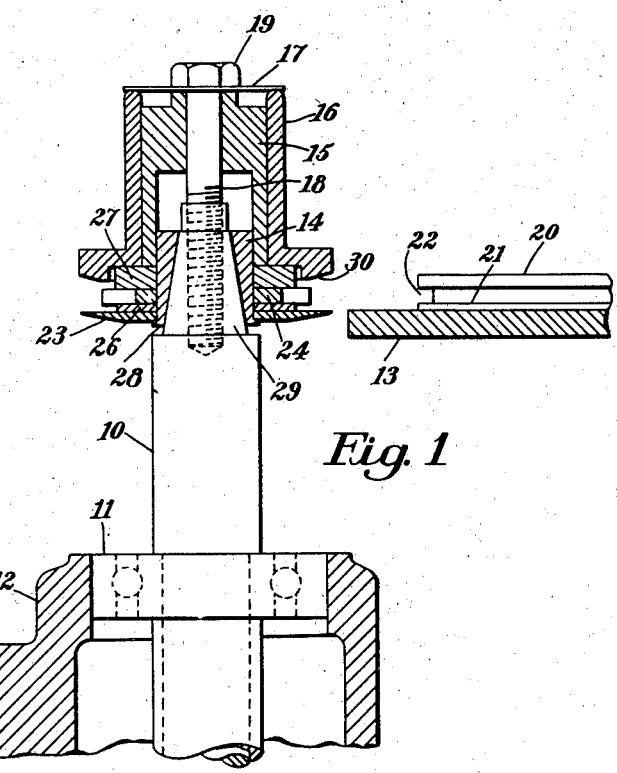

Referring to the drawing,

Fig. 1 is a vertical section of a portion of a machine equipped with a cutter-head embodying this invention; and Fig. 2 is a top plan view of the cutter-head alone.

With regard to so much of an organized machine as Fig. 1 includes, a power-driven shaft 10, rotatable about a vertical axis, is journaled in a bearing 11 in a frame 12. A work-table 13, rigidly related to the frame 12, is supported by means not illustrated. Although these elements are not elements of the invention herein claimed, they represent one organization for performing the operation to be described. On the other hand, a cutter-head embodying the invention may be used with a horizontal shaft with or without a work-table corresponding to the work-table 13.

The cutter-head includes an inner clamping member 14, an outer clamping member 15, a slidable sleeve 16, a leaf-spring 17, a clamping screw 18 having a head 19, and a series of annular disks positively clamped by the members 14 and 15. These elements are all concentrically related to the rotational axis established by the shaft 10, the clamping members 14 and 15 being telescopically related to each other, and the sleeve 16 being telescopically related to the outer clamping member.

The number, the dimensions and the functions of the annular disks to be positively clamped by the members 14 and 15 will be determined according to the specific requirements of the work. The example of work represented in Fig. 1 is a sole 20, one face of which is covered with thick woven fabric 21 adhesively bonded thereto. The body of the sole is a synthetic substance containing rubber and granulated cork. This substance is made in large sheets to which the fabric 21 is bonded before soles are cut therefrom. After a sole of this type has been cut from a sheet its perimeter needs to be rabbeted to provide a groove 22 of which one wall will contain only the fabric 21 which must be preserved without being attacked by the cutter or otherwise damaged.

This example of work requires four work-engaging disks, viz., a relatively large disk 23 to engage and brace the margin of the fabric 21, a cutting disk 24 having peripheral cutting edges 25, a spacing disk 26 of the same thickness as the fabric 21 and lying between the disks 23 and 24, and a disk 27 (edge-gage) having a smooth circular periphery for engaging the perimeter of the body of the sole to control the depth of the groove 22. The inner clamping member 14 is provided with a peripheral flange 28 against which the stack of annular disks may be positively clamped by the outer clamping member 15 when the screw 18 is tightened to fasten the cutter-head to the shaft. The latter is centrally bored and provided with an internal screw-thread to take the screw 18, and the tapered portion 29 thereof provides a seat by which the inner clamping member is located centrally and buttressed axially against the thrust of the screw.

The mid-portion of the leaf-spring 17 is located between the outer clamping member 15 and the head of the screw 18, and is therefore an element of the pressure-applying means by which the annular disks are positively clamped against the flange 28. The shank of the screw 18 extends through a hole 31 in the spring which, as shown, has two diametrically opposite resilient arms both overlapping and engaging one end of the sleeve 16. The sleeve is thereby maintained normally in contact with the annular disk 27 but may be displaced axially therefrom in response to demands of the work. The spring is normally flat throughout its area. Therefore, its power of resistance to displacement of the sleeve will be the same after every reassembling of the parts, regardless of which of its faces is against the sleeve.

The sleeve is provided with an annular and slightly coned marginal face 30 that normally surrounds the disk 27 and confronts the margin of the disk 23. The conical surface 30 facilitates insertion of a work-piece between it and the disk 23, and if the thickness of the disk 27 is co-ordinated with that of the work the sleeve 16 will be slightly displaced away from the disk 23 by the camming effect of the surface 30. When this occurs, the reaction of the spring 17 maintains the work-piece against the disk 23 to prevent the fabric 21 from entering the zone of rotation of the cutting edges 25.

Since the work-pieces of one lot may be thicker or thinner than those of another, interchangeable disks 27 of different thicknesses may be substituted, one for another, without producing any difference in the effect of the spring, because the normal relation of the sleeve 16 to the clamping member 15 would be the same in all cases, regardless of the thickness of the disk 27 in use.

Although the sleeve 16 will rotate with the other elements of the assemblage when no work is being done, it is not driven otherwise than by the friction of its bearing surfaces. On the other hand, when the sleeve is displaced by a work-piece, and its rotation arrested thereby, the spring 17 will merely slide on its smooth outer end with little tendency to drive it.

Having described my invention, what I claim as new and desire to secure by Letters Patent of the United States is:

1. A rotary cutter-head comprising an inner clamping member and an outer clamping member telescopically related to each other and concentrically related to the rotational axis of the assemblage, the inner clamping member having a peripheral flange confronting the outer clamping member, a plurality of annular work-engaging disks lying face to face and surrounding said inner clamping member between said flange and the outer clamping member, pressure-applying means including a screw extending through said outer clamping member and having a head for forcing the latter and said disks positively against said flange, a sleeve surrounding and telescopically related to said outer clamping member, said sleeve and one of said disks having confronting end faces adapted to engage opposite faces of the margin of a sole inserted between them, and a resilient member fastened to said outer clamping member by said screw and thereby maintained in a position to press said sleeve with yielding force toward said flange, one of said disks having cutting edges arranged to cut the perimeter of a sole lying between said confronting faces.

2. A rotary cutter-head comprising an inner clamping member and an outer clamping member telescopically related to each other and concentrically related to the rotational axis of the assemblage, the inner clamping member having a peripheral flange confronting the outer clamping member, a plurality of annular work-engaging disks lying face to face and surrounding said inner clamping member between said flange and the outer clamping member, pressure-applying means including a screw extending through said outer clamping member and having a head for forcing the latter and said disks positively against said flange, a sleeve surrounding and telescopically related to said outer clamping member, said sleeve and one of said disks having confronting end faces adapted to engage opposite faces of the margin of a sole inserted between them, and a leaf-spring arranged to maintain said sleeve normally in contact with one of said disks, a portion of said spring lying between the head of said screw and said outer clamping member and constituting an element of said pressure-applying means, one of said disks having cutting edges arranged to cut the perimeter of a sole lying between said confronting faces.

EUGENE J. RAY.